United States Patent
Wisgo

(10) Patent No.: US 10,474,482 B2
(45) Date of Patent: Nov. 12, 2019

(54) SOFTWARE APPLICATION DYNAMIC LINGUISTIC TRANSLATION SYSTEM AND METHODS

(71) Applicant: Citrix Systems, Inc., Fort Lauderdale, FL (US)

(72) Inventor: Jeffrey D. Wisgo, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 34 days.

(21) Appl. No.: 15/843,449

(22) Filed: Dec. 15, 2017

(65) Prior Publication Data
US 2019/0188004 A1   Jun. 20, 2019

(51) Int. Cl.
| | |
|---|---|
| G06F 3/00 | (2006.01) |
| G06F 9/451 | (2018.01) |
| G06F 17/28 | (2006.01) |
| G06F 17/27 | (2006.01) |
| G06K 9/18 | (2006.01) |
| G06F 3/0484 | (2013.01) |
| G06F 8/656 | (2018.01) |

(52) U.S. Cl.
CPC ............ *G06F 9/454* (2018.02); *G06F 3/0484* (2013.01); *G06F 8/656* (2018.02); *G06F 17/2735* (2013.01); *G06F 17/289* (2013.01); *G06K 9/18* (2013.01)

(58) Field of Classification Search
CPC .................................. G06F 9/54; G06F 5/14
USPC .......................................... 719/310; 715/790
See application file for complete search history.

(56) References Cited

U.S. PATENT DOCUMENTS

| | | | | |
|---|---|---|---|---|
| 6,092,036 A | * | 7/2000 | Hamann | G06F 9/454 704/8 |
| 9,405,745 B2 | * | 8/2016 | Dendi | G06F 17/289 |
| 9,971,767 B1 | * | 5/2018 | Chang | G06F 3/0481 |
| 2002/0026475 A1 | * | 2/2002 | Marmor | H04L 67/2823 709/203 |
| 2005/0197825 A1 | * | 9/2005 | Hagerman | G06F 17/289 704/2 |
| 2008/0077384 A1 | * | 3/2008 | Agapi | G06F 9/454 704/2 |
| 2013/0124159 A1 | * | 5/2013 | Chen | G06T 5/006 703/2 |
| 2015/0234811 A1 | * | 8/2015 | Bareket | G06F 17/289 704/2 |

OTHER PUBLICATIONS

Robert Godwin-Jones, Emerging Technologies Mobile Apps for Language Learning. (Year: 2011).*

* cited by examiner

*Primary Examiner* — Lechi Truong
(74) *Attorney, Agent, or Firm* — Fox Rothschild LLP; Robert J. Sacco; Carol E Thorstad-Forsyth

(57) ABSTRACT

Aspects of the present disclosure relate to text and/or image translation computing systems, and in particular, text and image processing of user-interface elements during run-time of a software application. Code is injected into an application binary file. During execution of the application the injected code executes to identify user-interface elements defined within the application and extracts various textual aspects, such as text strings, from the user-interface elements. The system translates the extracted text strings into a desired language and modifies the user-interface element to include the translated text.

21 Claims, 3 Drawing Sheets

SOFTWARE APPLICATION DYNAMIC LINGUISTIC TRANSLATION SYSTEM AND METHODS

TECHNICAL FIELDS

Aspects of the present disclosure relate to text and/or image translation computing systems, and in particular, text and image processing of user-interface elements during run-time of a software application.

BACKGROUND

Due to global computing network connectivity, the need for improved, automated, and highly accurate language translation capabilities within software is greater than ever. However, most software applications (e.g., mobile, desktop, or Software as a Service applications) only support a specific and limited set of languages for use in generating and displaying textual aspects of run-time user-interface elements, such as buttons, pull-down menus, windows, and/or the like.

Thus, when a specific user needs to access and an application with such limitations, the user must either: 1) continue to use the application in an undesired language; or 2) request that the developers of the application re-develop the software to enable the software application to support the desired language(s), which is time-consuming, labor-intensive, and expensive. Moreover, in the context of an enterprise application, the source code of the software application may not even be available for redevelopment. It is with these problems, among others, that aspects of the present disclosure where conceived.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure involve network-based computing systems and architectures that automatically replace textual aspects (e.g., text strings) and/or textual components of user-interfaces (e.g., graphical-user interfaces) included or otherwise displayed in an executing software application. In various aspects, the disclosed system automatically injects code into a software application binary file using, for example, a wrapping process. During execution of the software application (i.e., run-time) the injected code executes as a background process to identify one or more user-interface elements defined within the software application or otherwise associated with the execution of the software application. The injected code (i.e., executing as a background process) analyzes the identified user-interface elements to extract various textual aspects, such as text strings, associated with the identified user-interface elements. The system translates the extracted text strings into a desired language (a language that is not supported by the application) and automatically modifies the associated user-interface element to include the translated text for inclusion and/or integration into the executing software application (i.e., during run-time).

Figure 1:
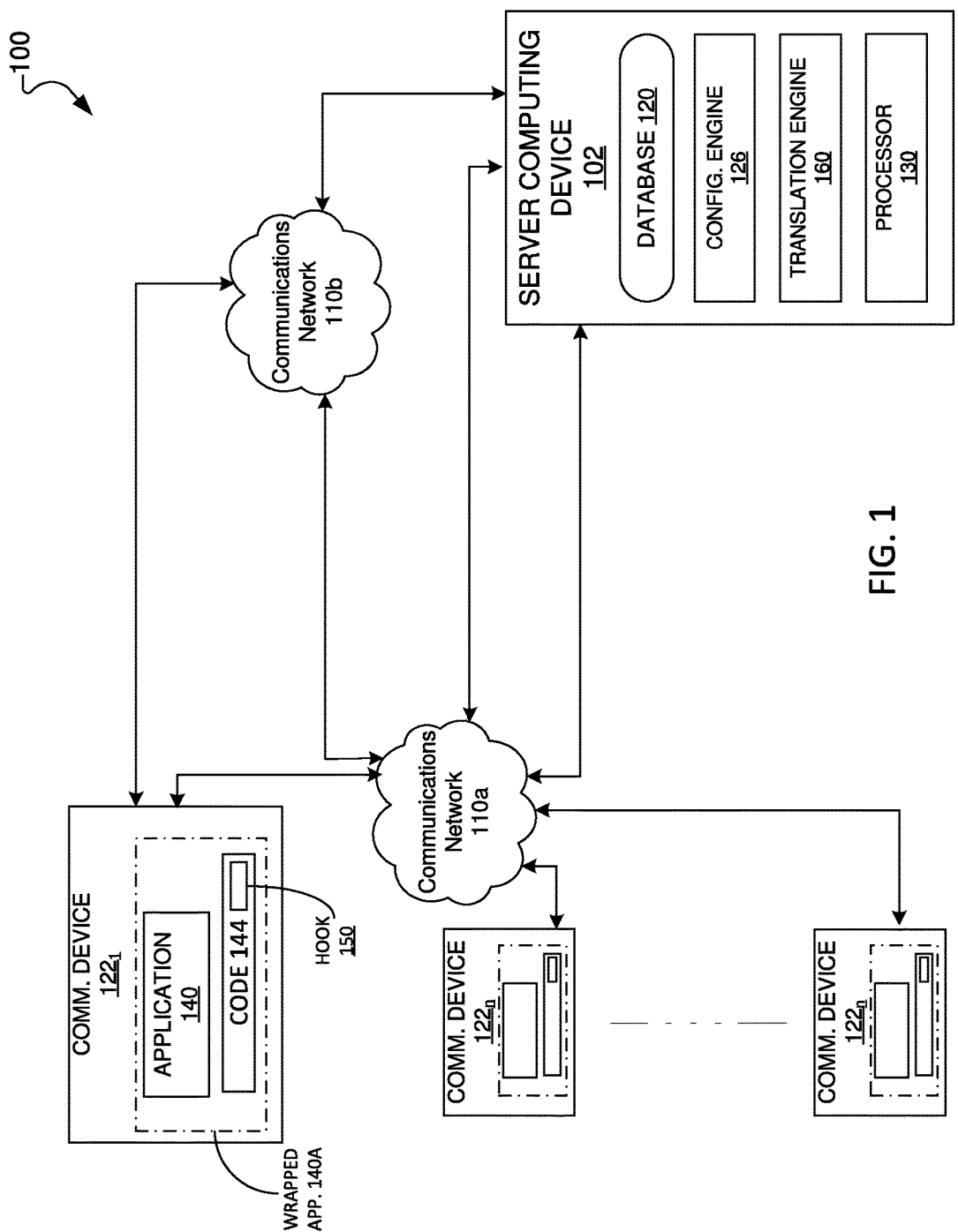
FIG. 1 is an example computing environment for replacing or modifying textual aspects of user-interface elements in a software application during run-time, according to aspects of the present disclosure.

FIG. 1 provides and illustration of an implementation of a computing system or architecture 100 that enables the replacement or modification of textual aspects of user-interface elements of a software application during run-time, according to aspects of the present disclosure. As illustrated, FIG. 1 includes various computing devices communicating through one or more networks 110a, 110b. The one or more networks may be an IP-based telecommunications network, the Internet, an intranet, a local area network, a wireless local network, a content distribution network, or any other type of communications network, as well as combinations of networks. For example, in one particular embodiment, the networks 110a and 110b may be a telecommunications network including fiber-optic paths between various network elements, such as servers, switches, routers, and/or other optical telecommunications network devices that interconnect to enable receiving and transmitting of information between the various elements as well as users of the network.

The computing environment 100 includes a server computing device 102 that is in communication with communication devices ($122_1$, $122_2$, . . . , $122_n$) located at one or more geographic locations. The server computing device 102, may be a processing device that functionally connects or otherwise communicates (e.g., using the one or more networks 110a, 100b) with communication devices ($122_1$, $122_2$, . . . , $122_n$) included within the computing environment 100. The communication devices ($122_1$, $122_2$, . . . , $122_n$) may be any of, or any combination of, a personal computer; handheld computer; mobile phone; digital assistant; smart phone; server; application; and the like. In one embodiment, each of the communication devices ($122_1$, $122_2$, . . . , $122_n$) may include a processor-based platform that operates on any suitable operating system, such as Microsoft® Windows®, Linux®, Android, and/or the like that is capable of executing software processes, software, applications, etc. The communication devices ($122_1$, $122_2$, . . . , $122_n$) devices may also include a communication system to communicate with the various components of the computing environment 100 via a wireline and/or wireless communications, such as networks 110a, 100b.

The server computing device 102 includes a database 124, a configuration engine 126, a translation engine 128, and a processor 130. The database 120 may be a database, data store, storage and/or the like, for storing data associated with replacing user-interface elements and related textual components within a software application at run-time. In one specific example, the database 120 may be a translation dictionary that stores data for translating words and phrases from a first language to a second language, as will be further explained below.

The configuration engine 126 provides a mechanism, such as a wrapping mechanism, that injects a code 144 into a platform of the communication devices ($122_1$, $122_2$, ..., $122_n$) and thereby wrap (illustrated as 140a) a software application 140 loaded on the communication devices ($122_1$, $122_2$, ..., $122_n$) and currently capable of supporting a first language but not a second language. Thus, the platform of the communication devices ($122_1$, $122_2$, ..., $122_n$) supports the software application 140 that is wrapped by a code 144, which enables the software application 140 to communicate with the translation engine 160 of the server computing device 102. It also enables the translation engine 160 to translate textual aspects of the software application from a first language supported by the application to a second language not supported by the application. Stated differently, the communication between the translation engine 160 and the software application 140 allows the translation engine 160 to automatically identify and translate textual aspects of user-interface elements of the software application 140. More specifically, during run-time of the software application 140, the code 144 may communicate with the translation engine 160 of the server computing device 102 to enable the translation engine 160 to translate textual aspects of various user-interfaces of the software application 140.

In contrast to the wrapping model where the software application's original source code is not available, in the SDK model the binary and header file(s) that include the business logic to do the string extraction (i.e., textual aspect(s)), etc. is explicitly added or otherwise inserted into a development project or other build files associate with the software application in question. Once the source file(s) are added to the project, the needed initializer functions will start at runtime, triggering establishment of the hooks in a similar fashion to the wrapping model. One advantage of the SDK model, however, is that there can be a tighter, more explicit relationship between the application and the translation engine's logic. For example, the software application can explicitly present its strings to the translation logic, which can improve performance as well as accuracy.

The translation engine 160 receives textual aspects (e.g., text strings) associated with user-interface components of the software application 140 and translates the textual aspects from a first language into a second, different language. To enable the translation, the translation engine 160 may search the database 120, which stores or otherwise contains terms, sentences, and phrases in which sentences in a certain language and original/translation sentences in another language corresponding thereto have been accumulated. Stated differently, a source language text (namely, a text written in a source language) is parsed or analyzed, to be converted into an intermediate expression such as a syntactic tree or a conceptional structure, and then a target language translation of the text is formed. Additionally, the database 120 may store a list of options for translation of a certain term (e.g., a word in a sentence).

Figure 2:
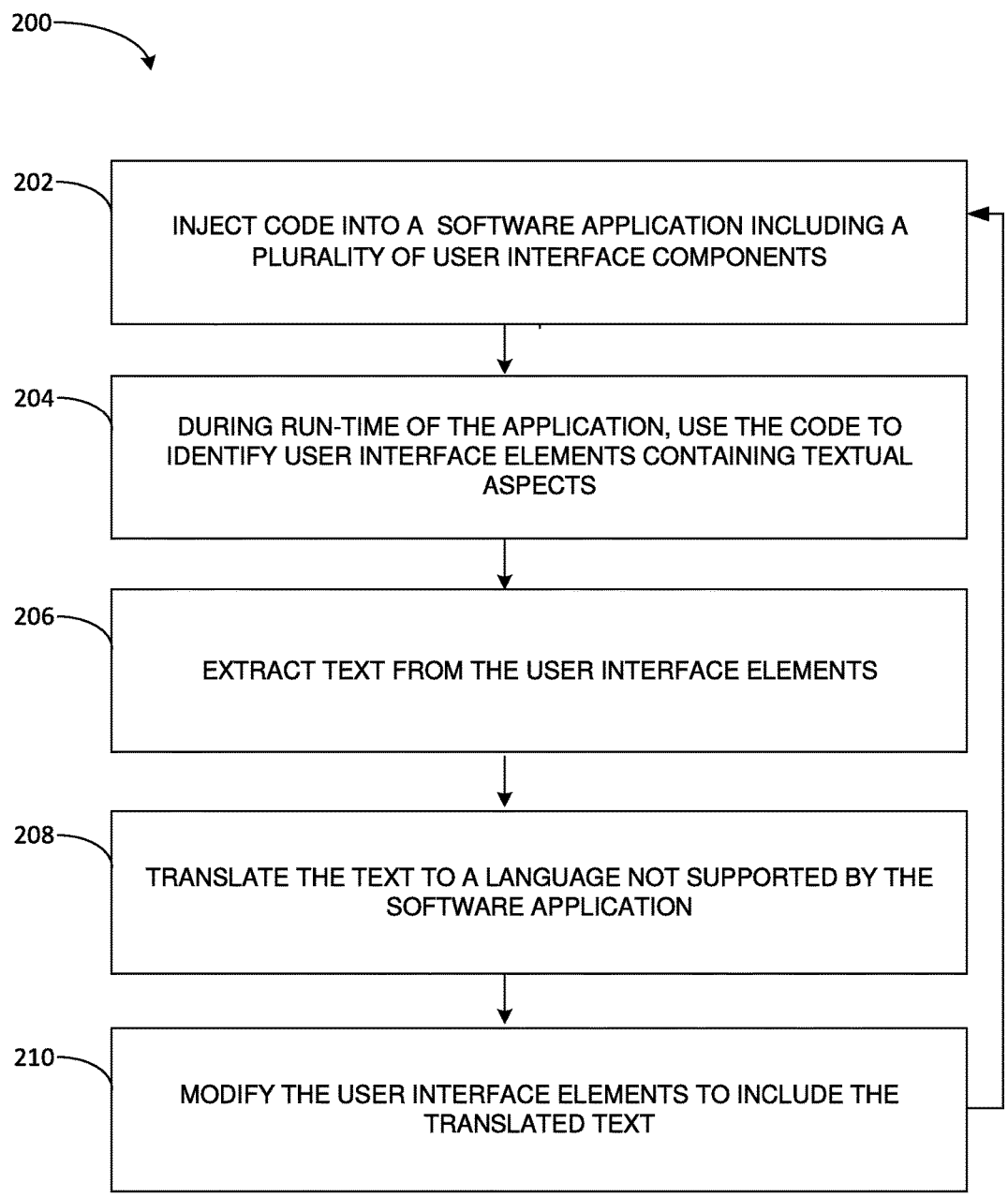
FIG. 2 is flow chart or process for replacing or modifying textual aspects of user-interface elements in a software application during run-time, according to aspects of the present disclosure.

Referring now to FIG. 2 and with reference to FIG. 1, a process 200 for automatically replacing user-interface elements within a software application at run-time is provided. As illustrated, process 200 begins at 202, injecting code into a software application including a plurality of user interface elements. Referring to FIG. 1, the configuration engine 122 may inject the code 144 into the software application 140 by wrapping the software 140 with the code 144. The wrapping involves injecting references to a hook 150 of the code 144 into the software application 140's binary code, that, during run-time replaces or otherwise modifies various function calls (e.g., system calls) of the software application 140. The hook 150 enables the code 144 to execute as a background process during run-time of the software application 140. In other embodiments, the code 144 may not execute as a background process or thread, as the hooks themselves are called on the same thread the original function (that is being hooked) is/was running, though the processing can be deferred to background processes or threads as needed.

Referring again to FIG. 2, at 204, during run-time of the software application the injected code is used to identify user-interface elements containing text-based aspects, such as text strings. Referring to FIG. 1, during the execution state of the software application 140, the code 144 executes in the background and will process the execution sate of the software application 140 to identify user-interface elements of the software application 140. In one example, the code 144 may access a data structure of the software application 140 that represents the software application's user-interface elements as a tree-like hierarchical structure comprising a set of linked nodes (e.g., parent, sibling, and child nodes). In such a scenario, the code 144 automatically traverses or walks the tree to identify the user-interface elements and any corresponding textual aspects, such as a text string. In some embodiments, the hook technology or mechanism may be separate from the code that establishes the hooks. So the same hooking can be used for SDK or wrapping approach.

Alternatively, the code 144 may capture screen shot images of the executing application and perform optical character recognition ("OCR") processing on the screen shots to identify user-interface elements with textual aspects, such as a text string. For example, in one embodiment, the code 144 used OCR to analyze the structure of the screen shot image and divides the screen shot into elements such as blocks of texts, tables, images, etc.

Referring again to FIG. 2, at 206, the text is extracted from the identified user-interface element. Referring to FIG. 1, when the code 144 processes a tree data structure, the identified objects corresponding to user interface elements are processed to identify text data defined or otherwise associated with the objects. The object corresponding to the identified user-interface element may be transmitted to the translation engine 160 for processing or be processed locally by the code 144. When the code 144 uses OCR processing, the identified blocks of texts are divided into words and then—into characters, thereby defining a string of text. The block of text may be transmitted to the translation engine 160 for processing or be processed locally by the code 144.

Referring again to FIG. 2, at 208, the text is translated into a language not supported by the run-time version of the software application. Referring to FIG. 1, the obtained text is transmitted to the translation unit 160 for translation from a first language to a second language, that is not officially supported by the executing software application. Referring to FIG. 1, the translation unit 160 processes the text against the database 120, which as explained above, contains a set of source-to-target language translations for each word, phrase, sentence, or topic the database is being used for (e.g., a translation dictionary is maintained in the database 120). In some instances, database 120 may be stored on the communication devices ($122_1$, $122_2$, ..., $122_n$), which would improve performance.

Referring again to FIG. 2, at 210, the identified user-interface element is modified to include the translated text. Referring to FIG. 1, the translation unit 160 transmits the translated text to the code 144, which in turn, automatically updates the user interface component within the executing software application 140. In some instances, the user interface element may be customized for a more unique and personalized user experience. For example, the fonts, size and location of the text within the user-interface element may be modified. In other instances, the user-interface element may not be modified and instead, an text may be displayed within the software application as an overlay of the user-interface component. For example, if the text is being interpreted at an image level (i.e. if OCR was used), then a new image must be made which renders the new translated text, and that image superimposed on top of the previous image. If the text is understood at an object level (this means the OS gave us details about the text elements themselves, like in a string format), then those object(s) just need to be changed to reflect the new text, and the OS should render them as needed. However, in the latter case it may be required to trigger the OS to 'redraw' the text element(s) in question.

The process 200 is continuous and continues until the software application 140 is executed or backgrounded with the platform of the communications device.

Figure 3:
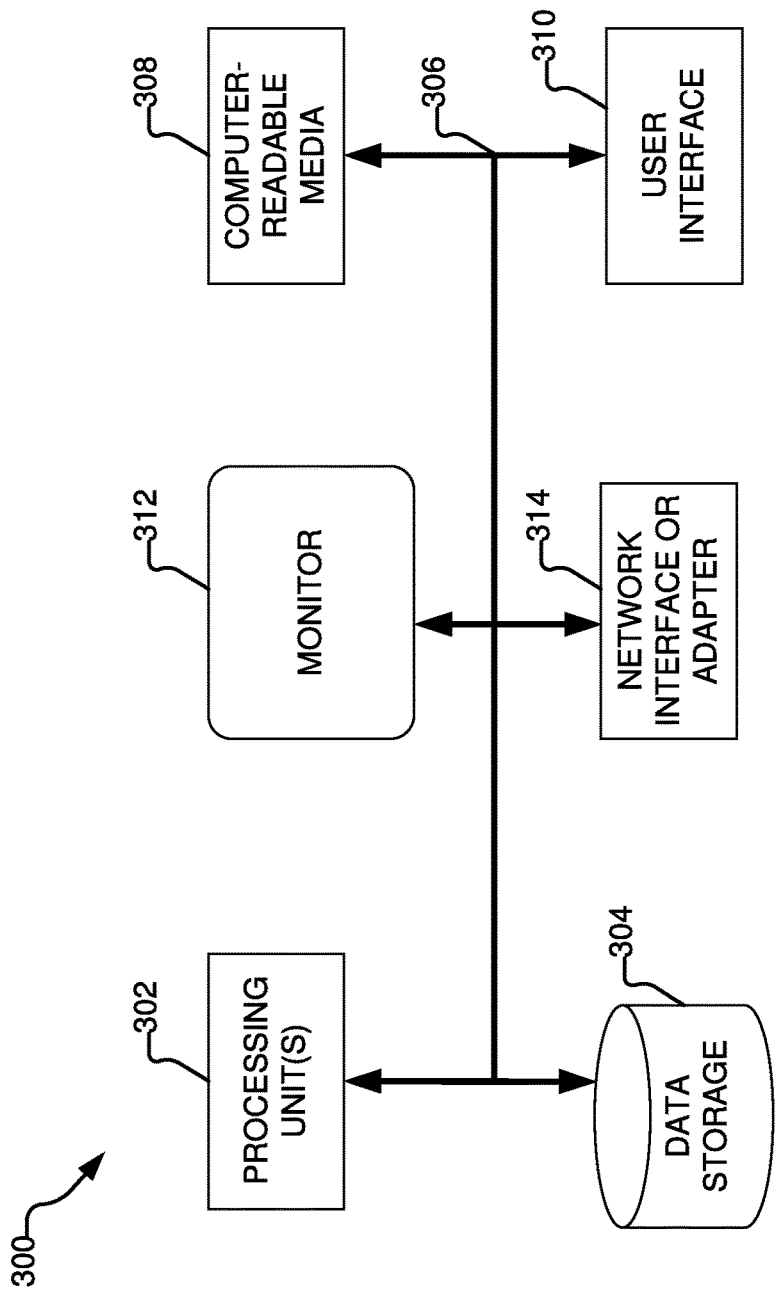
FIG. 3 is a diagram of a computing system specifically implemented for replacing or modifying textual aspects of user-interface elements in a software application during run-time, according to aspects of the present disclosure.

FIG. 3 illustrates an example of a suitable computing and networking environment 300 that may be used to implement various aspects of the present disclosure described in FIG. 1-3. As illustrated, the computing and networking environment 300 includes a general purpose computing device 300, although it is contemplated that the networking environment 300 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 300 may include various hardware components, such as a processing unit 302, a data storage 304 (e.g., a system memory), and a system bus 306 that couples various system components of the computer 300 to the processing unit 302. The system bus 306 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 300 may further include a variety of computer-readable media 308 that includes removable/non-removable media and volatile/nonvolatile media, but excludes transitory propagated signals. Computer-readable media 308 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other media that may be used to store the desired information/data and which may be accessed by the computer 300.

Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 304 includes computer storage media in the form of volatile/nonvolatile memory such as read only memory (ROM) and random access memory (RAM). A basic input/output system (BIOS), containing the basic routines that help to transfer information between elements within the computer 300 (e.g., during start-up) is typically stored in ROM. RAM typically contains data and/or program modules that are immediately accessible to and/or presently being operated on by processing unit 302. For example, in one embodiment, data storage 304 holds an operating system, application programs, and other program modules and program data.

Data storage 304 may also include other removable/non-removable, volatile/nonvolatile computer storage media. For example, data storage 304 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 3, provide storage of computer-readable instructions, data structures, program modules and other data for the computer 300.

A user may enter commands and information through a user interface 310 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 302 through a user interface 310 that is coupled to the system bus 306, but may be connected by other interface and bus structures, such as a parallel port, game port or a universal serial bus (USB). A monitor 312 or other type of display device is also connected to the system bus 306 via an interface, such as a video interface. The monitor 312 may also be integrated with a touch-screen panel or the like.

The computer 300 may operate in a networked or cloud-computing environment using logical connections of a network interface or adapter 314 to one or more remote devices, such as a remote computer. The remote computer may be a personal computer, a server, a router, a network PC, a peer device or other common network node, and typically includes many or all of the elements described above relative to the computer 300. The logical connections depicted in FIG. 3 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 300 may be connected to a public and/or private network through the network interface or adapter 314. In such embodiments, a modem or other means for establishing communications over the network is connected to the system bus 306 via the network interface or adapter 314 or other appropriate mechanism. A wireless networking component including an interface and antenna may be coupled through a suitable device such as an access point or peer computer to a network. In a networked environment, program modules depicted relative to the computer 300, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method for modifying software applications, comprising:
    injecting code into a software application that was previously loaded onto a computing device, where
       the software application includes a plurality of user-interface elements and is implemented to generate text, included within respective user-interface elements of the plurality of user-interface elements, in a first language but not in a second language,
       the second language is different than the first language and is not supported by the software application, and
       the code facilitates communication between the software application and a translation engine of a remote device; and
    during run-time of the software application on the computing device:
       using the injected code to identify a first user-interface element of the plurality of user-interface elements that is displayed and comprises a first text written in the first language;
       rendering an object showing at least a portion of the first user-interface element having the first text replaced with a second text, the second text comprising the first text translated into the second language; and
       overlaying the object on top of the at least a portion of the first user-interface element comprising the first text, where the second text of the object is shown with at least one customized character font or spacing characteristic that is different than a corresponding character font or spacing characteristic of the first text.

2. The method of claim 1, wherein during run-time of the software application on a computing device further comprises extracting the first text from the user-interface element using an optical character recognition algorithm.

3. The method of claim 2, further comprising translating the first text from the first language to the second language using a dictionary and translation algorithm.

4. The method of claim 1, wherein during run-time of the software application on a computing device further comprises:
    using the code to identify a second user-interface element of the plurality of user-interface elements, the second user-interface element comprising a third text written in the first language; and
    modifying the second user-interface element to include the third text written in the second language.

5. The method of claim 4, wherein the second user-interface element is modified by:
    removing the third text from the second user-interface element;
    adding the third text written in the second language to the second user-interface element; and
    re-writing the second user-interface element for display on the computing device.

6. The method of claim 4, wherein identifying the second user-interface element comprises traversing a data structure, of the software application, to identify an object corresponding to the second user-interface element, the data structure representing the plurality of user-interface elements as a respective plurality of data objects.

7. The method of claim 1, wherein the code executes as a background process of the run-time of the software application.

8. The method of claim 1, wherein the first user-interface element is at least one of a button, check box, label button, radio button, slider, droplist, text box, window, icon, menu, widget, and tab.

9. A system for modifying software applications, comprising:
    a client computing device comprising hardware and a software application loaded thereon, the software application including a plurality of user interface elements, the software application implemented to generate text, included within respective user-interface elements of the plurality of user-interface elements, in a first language but not in a second language, and the second language being different than the first language and not supported by the software application; and
    a server computing device in communication with the client computing device, the server computing device comprising hardware and software configured to:
       inject code into the software that facilitates communication between the software application of the client computing device and a translation engine of the server computing device; and
       during run-time of the software application on the client computing device:
          use the code to identify a first user-interface element of the plurality of user-interface elements that is displayed and comprises a first text written in the first language;
          render an object showing at least a portion of the first user-interface element having the first text replaced with a second text, the second text comprising the first text translated into the second language; and
          overlaying the object on top of the at least a portion of the first user-interface element comprising the first text, where the second text of the object is shown with at least one customized character font or spacing characteristic that is different than a corresponding character font or spacing characteristic of the first text.

10. The system of claim 9, wherein during run-time of the software application on the client computing device further comprises extracting the first text from the user-interface element using an optical character recognition algorithm.

11. The system of claim 10, wherein the server computing device is further configured to translate the first text from the first language to the second language using a dictionary and translation algorithm.

12. The system of claim 9, wherein during run-time of the software application on the client computing device further comprises:
   using the code to identify a second user-interface element of the plurality of user-interface elements, the second user-interface element comprising a third text written in the first language; and
   modifying the second user-interface element to include the third text written in the second language.

13. The system of claim 12, wherein the second user-interface element is modified by:
   removing the third text from the second user-interface element;
   adding the third text written in the second language to the second user-interface element; and
   re-writing the second user-interface element for display on the computing device.

14. The system of claim 12, wherein identifying the second user-interface element comprises traversing a data structure, of the software application, to identify an object corresponding to the second user-interface element, the data structure representing the plurality of user-interface elements as a respective plurality of data objects.

15. The system of claim 9, wherein the code executes as a background process of the run-time of the software application.

16. A non-transitory computer readable medium encoded with instructions for modifying software applications, the instructions executable by one or more computing devices, comprising:
   injecting code into a software application, where
      the software application includes a plurality of user-interface elements and is implemented to generate text, included within respective user-interface elements of the plurality of user-interface elements, in a first language but not in a second language,
      the second language is different than the first language and is not supported by the software application, and
      the code facilitates communication between the software application and a translation engine of a remote device; and
   during run-time of the software application:
      use the code to identify a first user-interface element of the plurality of user-interface elements that comprises a first text written in a first language;
      render an object showing at least a portion of the first user-interface element having the first text replaced with a second text, the second text comprising the first text translated into the second language; and
      overlying the object on top of the at least a portion of the first user-interface element comprising the first text, where the second text of the object is shown with at least one customized character font or spacing characteristic that is different than a corresponding character font or spacing characteristic of the first text.

17. The non-transitory computer readable medium of claim 16, wherein during run-time of the software application on a computing device further comprises extracting the first text from the user-interface element using an optical character recognition algorithm.

18. The non-transitory computer readable medium of claim 17, further comprising translating the first text from the first language to the second language using a dictionary and translation algorithm.

19. The non-transitory computer readable medium of claim 17, wherein during run-time of the software application on a computing device further comprises:
   using the code to identify a second user-interface element of the plurality of user-interface elements, the second user-interface element comprising a third text written in the first language; and
   modifying the second user-interface element to include the third text written in the second language.

20. The non-transitory computer readable medium of claim 19, wherein the second user-interface element is modified by:
   removing the third text from the second user-interface element;
   adding the third text to the second user-interface element; and
   re-writing the second user-interface element for display on the computing device.

21. The non-transitory computer readable medium of claim 19, wherein identifying the second user-interface element comprises traversing a data structure, of the software application, to identify an object corresponding to the second user-interface element, the data structure representing the plurality of user-interface elements as a respective plurality of data objects.

* * * * *